US009785435B1

(12) United States Patent
Bradbury et al.

(10) Patent No.: US 9,785,435 B1
(45) Date of Patent: Oct. 10, 2017

(54) FLOATING POINT INSTRUCTION WITH SELECTABLE COMPARISON ATTRIBUTES

(71) Applicant: INTERNATIONAL BUSINESS MACHINES CORPORATION, Armonk, NY (US)

(72) Inventors: Jonathan D. Bradbury, Poughkeepsie, NY (US); Michael K. Gschwind, Chappaqua, NY (US); Silvia Melitta Mueller, Atdorf (DE); Brett Olsson, Cary, NC (US); Eric M. Schwarz, Gardiner, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/335,914

(22) Filed: Oct. 27, 2016

(51) Int. Cl.
| G06F 7/38 | (2006.01) |
| G06F 9/302 | (2006.01) |
| G06F 9/305 | (2006.01) |
| G06F 7/48 | (2006.01) |
| G06F 9/30 | (2006.01) |
| G06F 7/499 | (2006.01) |
| G06F 7/483 | (2006.01) |

(52) U.S. Cl.
CPC ........ G06F 9/30021 (2013.01); G06F 9/3001 (2013.01); G06F 7/483 (2013.01); G06F 7/49905 (2013.01); G06F 7/49926 (2013.01); G06F 7/49957 (2013.01); G06F 9/30018 (2013.01); G06F 9/30025 (2013.01); G06F 9/30029 (2013.01)

(58) Field of Classification Search
CPC .............. G06F 9/3001; G06F 9/30018; G06F 9/30021; G06F 9/30025; G06F 9/30029; G06F 7/49905; G06F 7/49926; G06F 7/49957; G06F 7/483; G06F 7/49921
USPC .......................... 712/221–224; 708/207, 495
See application file for complete search history.

(56) References Cited

U.S. PATENT DOCUMENTS

| 6,844,880 B1 * | 1/2005 | Lindholm ............... G06T 11/40 345/419 |
| 7,219,337 B2 * | 5/2007 | Cannon ............... G06F 9/45554 717/138 |
| 2001/0051969 A1 | 12/2001 | Oberman et al. |

(Continued)

OTHER PUBLICATIONS

IBM, "z/Architecture—Principles of Operation," IBM Publication No. SA22-2832-10, Eleventh Edition, Mar. 2015, pp. 1-1732.

(Continued)

*Primary Examiner* — Daniel Pan
(74) *Attorney, Agent, or Firm* — William A. Kinnaman, Jr., Esq.; Blanche E. Schiller, Esq.; Heslin Rothenberg Farley & Mesiti P.C.

(57) ABSTRACT

An instruction to perform a comparison of a first value and a second value is executed. Based on a control of the instruction, a compare function to be performed is determined. The compare function is one of a plurality of compare functions configured for the instruction, and the compare function has a plurality of options for comparison. A compare option based on the first value and the second value is selected from the plurality of options defined for the compare function, and used to compare the first value and the second value. A result of the comparison is then placed in a select location, the result to be used in processing within a computing environment.

20 Claims, 19 Drawing Sheets

(56) References Cited

U.S. PATENT DOCUMENTS

| | | | | |
|---|---|---|---|---|
| 2014/0164747 A1* | 6/2014 | Gschwind | ........... | G06F 9/30058 |
| | | | | 712/234 |
| 2014/0304314 A1* | 10/2014 | Lundvall | ................. | G06F 7/491 |
| | | | | 708/204 |
| 2016/0124712 A1 | 5/2016 | Larri et al. | | |

OTHER PUBLICATIONS

IBM, "Power ISA—V2.07B," Apr. 2015, pp. 1-1527.
Mel, Peter and Tim Grance, "The NIST Definition of Cloud Computing," National Institute of Standards and Technology, Information Technology Laboratory, Special Publication 800-145, Sep. 2011, pp. 1-7.

* cited by examiner

RESULTS FOR $M_6=0$

| Second Operand (a) Is | Results for VECTOR FP MAXIMUM (a:b) when Third Operand (b) Is | | | | | | | |
|---|---|---|---|---|---|---|---|---|
| | $-\infty$ | -Fn | -0 | +0 | +Fn | $+\infty$ | QNaN | SNaN |
| $-\infty$ | T(a) | T(b) | T(b) | T(b) | T(b) | T(b) | T(a) | Xi: T(b*) |
| -Fn | T(a) | T(M(a,b)) | T(b) | T(b) | T(b) | T(b) | T(a) | Xi: T(b*) |
| -0 | T(a) | T(a) | T(a) | T(b) | T(b) | T(b) | T(a) | Xi: T(b*) |
| +0 | T(a) | T(a) | T(a) | T(a) | T(b) | T(b) | T(a) | Xi: T(b*) |
| +Fn | T(a) | T(a) | T(a) | T(a) | T(M(a,b)) | T(b) | T(a) | Xi: T(b*) |
| $+\infty$ | T(a) | T(a) | T(a) | T(a) | T(a) | T(a) | T(a) | Xi: T(b*) |
| QNaN | T(b) | T(b) | T(b) | T(b) | T(b) | T(b) | T(a) | Xi: T(b*) |
| SNaN | Xi: T(a*) | Xi: T(a*) | Xi: T(a*) | Xi: T(a*) | Xi: T(a*) | Xi: T(a*) | Xi: T(a*) | Xi: T(a*) |

Explanation:

\* The SNaN is converted to the corresponding QNaN before it is placed in the target operand location.
T(x) The value x is placed at the target operand element location if no trapping exceptions on other elements.
M(x,y) Return the greater of floating point value x and y.
Fn Finite nonzero number (includes both subnormal and normal).
Xi: IEEE invalid-operation exception. The results shown are produced only when FPC 0.0 is zero.

FIG. 4A

RESULTS FOR $M_6=1$

| Second Operand (a) Is | Results for VECTOR FP MAXIMUM (a:b) when Third Operand (b) Is | | | | | | | |
|---|---|---|---|---|---|---|---|---|
| | $-\infty$ | -Fn | -0 | +0 | +Fn | $+\infty$ | QNaN | SNaN |
| $-\infty$ | T(a) | T(b) | T(b) | T(b) | T(b) | T(b) | T(b) | Xi: T(b*) |
| -Fn | T(a) | T(M(a,b)) | T(b) | T(b) | T(b) | T(b) | T(b) | Xi: T(b*) |
| -0 | T(a) | T(a) | T(a) | T(b) | T(b) | T(b) | T(b) | Xi: T(b*) |
| +0 | T(a) | T(a) | T(a) | T(a) | T(b) | T(b) | T(b) | Xi: T(b*) |
| +Fn | T(a) | T(a) | T(a) | T(a) | T(M(a,b)) | T(b) | T(b) | Xi: T(b*) |
| $+\infty$ | T(a) | T(a) | T(a) | T(a) | T(a) | T(a) | T(b) | Xi: T(b*) |
| QNaN | T(a) | T(a) | T(a) | T(a) | T(a) | T(a) | T(a) | Xi: T(b*) |
| SNaN | Xi: T(a*) | Xi: T(a*) | Xi: T(a*) | Xi: T(a*) | Xi: T(a*) | Xi: T(a*) | Xi: T(a*) | Xi: T(a*) |

Explanation:

\* The SNaN is converted to the corresponding QNaN before it is placed in the target operand location.
T(x) The value x is placed at the target operand element location if no trapping exceptions on other elements.
M(x,y) Return the greater of floating point value x and y.
Fn Finite nonzero number (includes both subnormal and normal).
Xi: IEEE invalid-operation exception. The results shown are produced only when FPC 0.0 is zero.

FIG. 4B

RESULTS FOR $M_6=2$

| Second Operand (a) Is | Results for VECTOR FP MAXIMUM (a:b) when Third Operand (b) Is | | | | | | | |
|---|---|---|---|---|---|---|---|---|
| | $-\infty$ | -Fn | -0 | +0 | +Fn | $+\infty$ | QNaN | SNaN |
| $-\infty$ | T(b) | T(b) | T(b) | T(b) | T(b) | T(b) | Xi: T(b) | Xi: T(b) |
| -Fn | T(a) | T(M(a,b)) | T(b) | T(b) | T(b) | T(b) | Xi: T(b) | Xi: T(b) |
| -0 | T(a) | T(a) | T(b) | T(b) | T(b) | T(b) | Xi: T(b) | Xi: T(b) |
| +0 | T(a) | T(a) | T(b) | T(b) | T(b) | T(b) | Xi: T(b) | Xi: T(b) |
| +Fn | T(a) | T(a) | T(a) | T(a) | T(M(a,b)) | T(b) | Xi: T(b) | Xi: T(b) |
| $+\infty$ | T(a) | T(a) | T(a) | T(a) | T(a) | T(b) | Xi: T(b) | Xi: T(b) |
| QNaN | Xi: T(b) | Xi: T(b) | Xi: T(b) | Xi: T(b) | Xi: T(b) | Xi: T(b) | Xi: T(b) | Xi: T(b) |
| SNaN | Xi: T(b) | Xi: T(b) | Xi: T(b) | Xi: T(b) | Xi: T(b) | Xi: T(b) | Xi: T(b) | Xi: T(b) |

Explanation:

T(x) The value x is placed at the target operand element location if no trapping exceptions on other elements.
M(x,y) Return the greater of floating point value x and y.
Fn Finite nonzero number (includes both subnormal and normal).
Xi: IEEE invalid-operation exception. The results shown are produced only when FPC 0.0 is zero.

FIG. 4C

RESULTS FOR $M_6=3$

| Seconds Operand (a) Is | Results for VECTOR FP MAXIMUM (a:b) when Third Operand (b) Is | | | | | | | |
|---|---|---|---|---|---|---|---|---|
| | $-\infty$ | -Fn | -0 | +0 | +Fn | $+\infty$ | QNaN | SNaN |
| $-\infty$ | T(a) | T(b) | T(b) | T(b) | T(b) | T(b) | Xi: T(a) | Xi: T(a) |
| -Fn | T(a) | T(M(a,b)) | T(b) | T(b) | T(b) | T(b) | Xi: T(a) | Xi: T(a) |
| -0 | T(a) | T(a) | T(a) | T(a) | T(b) | T(b) | Xi: T(a) | Xi: T(a) |
| +0 | T(a) | T(a) | T(a) | T(a) | T(b) | T(b) | Xi: T(a) | Xi: T(a) |
| +Fn | T(a) | T(a) | T(a) | T(a) | T(M(a,b)) | T(b) | Xi: T(a) | Xi: T(a) |
| $+\infty$ | T(a) | T(a) | T(a) | T(a) | T(a) | T(a) | Xi: T(a) | Xi: T(a) |
| QNaN | Xi: T(a) | Xi: T(a) | Xi: T(a) | Xi: T(a) | Xi: T(a) | Xi: T(a) | Xi: T(a) | Xi: T(a) |
| SNaN | Xi: T(a) | Xi: T(a) | Xi: T(a) | Xi: T(a) | Xi: T(a) | Xi: T(a) | Xi: T(a) | Xi: T(a) |

Explanation:

T(x) The value x is placed at the target operand element location if no trapping exceptions on other elements.
M(x,y) Return the greater of floating point value x and y.
Fn Finite nonzero number (includes both subnormal and normal).
Xi: IEEE invalid-operation exception. The results shown are produced only when FPC 0.0 is zero.

FIG. 4D

RESULTS FOR $M_6=4$

| Second | Results for VECTOR FP MAXIMUM (a:b) when Third Operand (b) Is | | | | | | | |
|---|---|---|---|---|---|---|---|---|
| Operand (a) Is | -∞ | -Fn | -0 | +0 | +Fn | +∞ | QNaN | SNaN |
| -∞ | T(a) | T(b) | T(b) | T(b) | T(b) | T(b) | T(a) | Xi: T(a) |
| -Fn | T(a) | T(M(a,b)) | T(b) | T(b) | T(b) | T(b) | T(a) | Xi: T(a) |
| -0 | T(a) | T(a) | T(a) | T(b) | T(b) | T(b) | T(a) | Xi: T(a) |
| +0 | T(a) | T(a) | T(a) | T(a) | T(b) | T(b) | T(a) | Xi: T(a) |
| +Fn | T(a) | T(a) | T(a) | T(a) | T(M(a,b)) | T(b) | T(a) | Xi: T(a) |
| +∞ | T(a) | T(a) | T(a) | T(a) | T(a) | T(a) | T(a) | Xi: T(a) |
| QNaN | T(b) | T(b) | T(b) | T(b) | T(b) | T(b) | T(a) | Xi: T(a) |
| SNaN | Xi: T(b) | Xi: T(b) | Xi: T(b) | Xi: T(b) | Xi: T(b) | Xi: T(b) | Xi: T(a) | Xi: T(a) |

Explanation:

T(x)  The value x is placed at the target operand element location if no trapping exceptions on other elements.
M(x,y)  Return the greater of floating point value x and y.
Fn  Finite nonzero number (includes both subnormal and normal).
Xi: IEEE invalid-operation exception. The results shown are produced only when FPC 0.0 is zero.

FIG. 4E

RESULTS FOR $M_6=8$

| Second | Results for VECTOR FP MAXIMUM (a:b) when Third Operand (b) Is | | | | | | | |
|---|---|---|---|---|---|---|---|---|
| Operand (a) Is | -∞ | -Fn | -0 | +0 | +Fn | +∞ | QNaN | SNaN |
| -∞ | T(a) | T(a) | T(a) | T(a) | T(a) | T(b) | T(a) | Xi: T(b*) |
| -Fn | T(b) | T(MS(a,b)) | T(a) | T(a) | T(MS(a,b)) | T(b) | T(a) | Xi: T(b*) |
| -0 | T(b) | T(b) | T(a) | T(b) | T(b) | T(b) | T(a) | Xi: T(b*) |
| +0 | T(b) | T(b) | T(a) | T(a) | T(b) | T(b) | T(a) | Xi: T(b*) |
| +Fn | T(b) | T(MS(a,b)) | T(a) | T(a) | T(MS(a,b)) | T(b) | T(a) | Xi: T(b*) |
| +∞ | T(a) | T(a) | T(a) | T(a) | T(a) | T(a) | T(a) | Xi: T(b*) |
| QNaN | T(b) | T(b) | T(b) | T(b) | T(b) | T(b) | T(a) | Xi: T(b*) |
| SNaN | Xi: T(a*) | Xi: T(a*) | Xi: T(a*) | Xi: T(a*) | Xi: T(a*) | Xi: T(a*) | Xi: T(a*) | Xi: T(a*) |

Explanation:

\*  The SNaN is converted to the corresponding QNaN before it is placed in the target operand location.
T(x)  The value x is placed at the target operand element location if no trapping exceptions on other elements.
M(x,y)  Return the greater of floating point value x and y.
MS(x,y)  If |x| = |y| return M(x,y), return x if |x| > |y|, otherwise return y
Fn  Finite nonzero number (includes both subnormal and normal).
Xi:  IEEE invalid-operation exception. The results shown are produced only when FPC 0.0 is zero.

FIG. 4F

RESULTS FOR $M_6$=9

| Second Operand (a) Is | Results for VECTOR FP MAXIMUM (a:b) when Third Operand (b) Is | | | | |
|---|---|---|---|---|---|
| | 0 | Fn | ∞ | QNaN | SNaN |
| 0 | T(\|a\|) | T(\|b\|) | T(\|b\|) | T(\|b\|) | Xi: T(\|b*\|) |
| Fn | T(\|a\|) | T(M(\|a\|,\|b\|)) | T(\|b\|) | T(\|b\|) | Xi: T(\|b*\|) |
| ∞ | T(\|a\|) | T(\|a\|) | T(\|a\|) | T(\|b\|) | Xi: T(\|b*\|) |
| QNaN | T(\|a\|) | T(\|a\|) | T(\|a\|) | T(\|a\|) | Xi: T(\|b*\|) |
| SNaN | Xi: T(\|a*\|) | Xi: T(\|a*\|) | Xi: T(\|a*\|) | Xi: T(\|a*\|) | Xi: T(\|a*\|) |

Explanation:

\*     The SNaN is converted to the corresponding QNaN before it is placed in the target operand location.
\|z\|   The value of z is used with the sign forced to be positive.
T(x)   The value x is placed at the target operand element location if no trapping exceptions on other elements.
M(x,y)   Return the greater of floating point value x and y.
Fn    Finite nonzero number (includes both subnormal and normal).
Xi:     IEEE invalid-operation exception. The results shown are produced only when FPC 0.0 is zero.

FIG. 4G

RESULTS FOR $M_6$=10

| Second Operand (a) Is | Results for VECTOR FP MAXIMUM (a:b) when Third Operand (b) Is | | | | |
|---|---|---|---|---|---|
| | 0 | Fn | ∞ | QNaN | SNaN |
| 0 | T(\|b\|) | T(\|b\|) | T(\|b\|) | Xi: T(\|b\|) | Xi: T(\|b\|) |
| Fn | T(\|a\|) | T(M(\|a\|,\|b\|)) | T(\|b\|) | Xi: T(\|b\|) | Xi: T(\|b\|) |
| ∞ | T(\|a\|) | T(\|a\|) | T(\|b\|) | Xi: T(\|b\|) | Xi: T(\|b\|) |
| QNaN | Xi: T(\|b\|) | Xi: T(\|b\|) | Xi: T(\|b\|) | Xi: T(\|b\|) | Xi: T(\|b\|) |
| SNaN | Xi: T(\|b\|) | Xi: T(\|b\|) | Xi: T(\|b\|) | Xi: T(\|b\|) | Xi: T(\|b\|) |

Explanation:

\|z\|   The value of z is used with the sign forced to be positive.
T(x)   The value x is placed at the target operand element location if no trapping exceptions on other elements.
M(x,y)   Return the greater of floating point value x and y.
Fn    Finite nonzero number (includes both subnormal and normal).
Xi:     IEEE invalid-operation exception. The results shown are produced only when FPC 0.0 is zero.

FIG. 4H

RESULTS FOR $M_6$=11

| Second Operand (a) Is | Results for VECTOR FP MAXIMUM (a:b) when Third Operand (b) Is | | | | |
|---|---|---|---|---|---|
| | 0 | Fn | ∞ | QNaN | SNaN |
| 0 | T(\|a\|) | T(\|b\|) | T(\|b\|) | Xi: T(\|a\|) | Xi: T(\|a\|) |
| Fn | T(\|a\|) | T(M(\|a\|,\|b\|)) | T(\|b\|) | Xi: T(\|a\|) | Xi: T(\|a\|) |
| ∞ | T(\|a\|) | T(\|a\|) | T(\|a\|) | Xi: T(\|a\|) | Xi: T(\|a\|) |
| QNaN | Xi: T(\|a\|) | Xi: T(\|a\|) | Xi: T(\|a\|) | Xi: T(\|a\|) | Xi: T(\|a\|) |
| SNaN | Xi: T(\|a\|) | Xi: T(\|a\|) | Xi: T(\|a\|) | Xi: T(\|a\|) | Xi: T(\|a\|) |

Explanation:

|z|   The value of z is used with the sign forced to be positive.
T(x)   The value x is placed at the target operand element location if no trapping exceptions on other elements.
M(x,y)   Return the greater of floating point value x and y.
Fn   Finite nonzero number (includes both subnormal and normal).
Xi:   IEEE invalid-operation exception. The results shown are produced only when FPC 0.0 is zero.

FIG. 4I

RESULTS FOR $M_6$=12

| Second Operand (a) Is | Results for VECTOR FP MAXIMUM (a:b) when Third Operand (b) Is | | | | |
|---|---|---|---|---|---|
| | 0 | Fn | ∞ | QNaN | SNaN |
| 0 | T(\|a\|) | T(\|b\|) | T(\|b\|) | T(\|a\|) | Xi: T(\|a\|) |
| Fn | T(\|a\|) | T(M(\|a\|,\|b\|)) | T(\|b\|) | T(\|a\|) | Xi: T(\|a\|) |
| ∞ | T(\|a\|) | T(\|a\|) | T(\|a\|) | T(\|a\|) | Xi: T(\|a\|) |
| QNaN | T(\|b\|) | T(\|b\|) | T(\|b\|) | T(\|a\|) | Xi: T(\|a\|) |
| SNaN | Xi: T(\|b\|) | Xi: T(\|b\|) | Xi: T(\|b\|) | Xi: T(\|a\|) | Xi: T(\|a\|) |

Explanation:

T(x)   The value x is placed at the target operand element location if no trapping exceptions on other elements.
M(x,y)   Return the greater of floating point value x and y.
Fn   Finite nonzero number (includes both subnormal and normal).
Xi:   IEEE invalid-operation exception. The results shown are produced only when FPC 0.0 is zero.

FIG. 4J

RESULTS FOR $M_6=0$

| Second | Results for VECTOR FP MINIMUM (a:b) when Third Operand (b) Is | | | | | | | |
|---|---|---|---|---|---|---|---|---|
| Operand (a) Is | -∞ | -Fn | -0 | +0 | +Fn | +∞ | QNaN | SNaN |
| -∞ | T(a) | T(a) | T(a) | T(a) | T(a) | T(a) | T(a) | Xi: T(b*) |
| -Fn | T(b) | T(M(a,b)) | T(a) | T(a) | T(a) | T(a) | T(a) | Xi: T(b*) |
| -0 | T(b) | T(b) | T(a) | T(a) | T(a) | T(a) | T(a) | Xi: T(b*) |
| +0 | T(b) | T(b) | T(b) | T(a) | T(a) | T(a) | T(a) | Xi: T(b*) |
| +Fn | T(b) | T(b) | T(b) | T(b) | T(M(a,b)) | T(a) | T(a) | Xi: T(b*) |
| +∞ | T(b) | T(b) | T(b) | T(b) | T(b) | T(a) | T(a) | Xi: T(b*) |
| QNaN | T(b) | T(b) | T(b) | T(b) | T(b) | T(b) | T(a) | Xi: T(b*) |
| SNaN | Xi: T(a*) | Xi: T(a*) | Xi: T(a*) | Xi: T(a*) | Xi: T(a*) | Xi: T(a*) | Xi: T(a*) | Xi: T(a*) |

Explanation:

\* The SNaN is converted to the corresponding QNaN before it is placed in the target operand location.
T(x) The value x is placed at the target operand element location if no trapping exceptions on other elements.
M(x,y) Return the lesser of floating point value x and y.
Fn Finite nonzero number (includes both subnormal and normal).
Xi: IEEE invalid-operation exception. The results shown are produced only when FPC 0.0 is zero.

FIG. 4K

RESULTS FOR $M_6=1$

| Second | Results for VECTOR FP MINIMUM (a:b) when Third Operand (b) Is | | | | | | | |
|---|---|---|---|---|---|---|---|---|
| Operand (a) Is | -∞ | -Fn | -0 | +0 | +Fn | +∞ | QNaN | SNaN |
| -∞ | T(b) | T(a) | T(a) | T(a) | T(a) | T(a) | T(b) | Xi: T(b*) |
| -Fn | T(b) | T(M(a,b)) | T(a) | T(a) | T(a) | T(a) | T(b) | Xi: T(b*) |
| -0 | T(b) | T(b) | T(b) | T(a) | T(a) | T(a) | T(b) | Xi: T(b*) |
| +0 | T(b) | T(b) | T(b) | T(b) | T(a) | T(a) | T(b) | Xi: T(b*) |
| +Fn | T(b) | T(b) | T(b) | T(b) | T(M(a,b)) | T(a) | T(b) | Xi: T(b*) |
| +∞ | T(b) | T(b) | T(b) | T(b) | T(b) | T(b) | T(b) | Xi: T(b*) |
| QNaN | T(a) | T(a) | T(a) | T(a) | T(a) | T(a) | T(a) | Xi: T(b*) |
| SNaN | Xi: T(a*) | Xi: T(a*) | Xi: T(a*) | Xi: T(a*) | Xi: T(a*) | Xi: T(a*) | Xi: T(a*) | Xi: T(a*) |

Explanation:

\* The SNaN is converted to the corresponding QNaN before it is placed in the target operand location.
T(x) The value x is placed at the target operand element location if no trapping exceptions on other elements.
M(x,y) Return the lesser of floating point values x and y.
Fn Finite nonzero number (includes both subnormal and normal).
Xi: IEEE invalid-operation exception. The results shown are produced only when FPC 0.0 is zero.

FIG. 4L

RESULTS FOR $M_6=2$

| Second | Results for VECTOR FP MINIMUM (a:b) when Third Operand (b) Is | | | | | | | |
|---|---|---|---|---|---|---|---|---|
| Operand (a) Is | -∞ | -Fn | -0 | +0 | +Fn | +∞ | QNaN | SNaN |
| -∞ | T(b) | T(a) | T(a) | T(a) | T(a) | T(a) | Xi: T(b) | Xi: T(b) |
| -Fn | T(b) | T(M(a,b)) | T(a) | T(a) | T(a) | T(a) | Xi: T(b) | Xi: T(b) |
| -0 | T(b) | T(b) | T(b) | T(b) | T(a) | T(a) | Xi: T(b) | Xi: T(b) |
| +0 | T(b) | T(b) | T(b) | T(b) | T(a) | T(a) | Xi: T(b) | Xi: T(b) |
| +Fn | T(b) | T(b) | T(b) | T(b) | T(M(a,b)) | T(a) | Xi: T(b) | Xi: T(b) |
| +∞ | T(b) | T(b) | T(b) | T(b) | T(b) | T(a) | Xi: T(b) | Xi: T(b) |
| QNaN | Xi: T(b) | Xi: T(b) | Xi: T(b) | Xi: T(b) | Xi: T(b) | Xi: T(b) | Xi: T(b) | Xi: T(b) |
| SNaN | Xi: T(b) | Xi: T(b) | Xi: T(b) | Xi: T(b) | Xi: T(b) | Xi: T(b) | Xi: T(b) | Xi: T(b) |

Explanation:

T(x)  The value x is placed at the target operand element location if no trapping exceptions on other elements.
M(x,y)  Return the lesser of floating point value x and y.
Fn  Finite nonzero number (includes both subnormal and normal).
Xi: IEEE invalid-operation exception. The results shown are produced only when FPC 0.0 is zero.

FIG. 4M

RESULTS FOR $M_6=3$

| Second | Results for VECTOR FP MINIMUM (a:b) when Third Operand (b) Is | | | | | | | |
|---|---|---|---|---|---|---|---|---|
| Operand (a) Is | -∞ | -Fn | -0 | +0 | +Fn | +∞ | QNaN | SNaN |
| -∞ | T(b) | T(a) | T(a) | T(a) | T(a) | T(a) | Xi: T(a) | Xi: T(a) |
| -Fn | T(b) | T(M(a,b)) | T(a) | T(a) | T(a) | T(a) | Xi: T(a) | Xi: T(a) |
| -0 | T(b) | T(b) | T(a) | T(a) | T(a) | T(a) | Xi: T(a) | Xi: T(a) |
| +0 | T(b) | T(b) | T(a) | T(a) | T(a) | T(a) | Xi: T(a) | Xi: T(a) |
| +Fn | T(b) | T(b) | T(b) | T(b) | T(M(a,b)) | T(a) | Xi: T(a) | Xi: T(a) |
| +∞ | T(b) | T(b) | T(b) | T(b) | T(b) | T(a) | Xi: T(a) | Xi: T(a) |
| QNaN | Xi: T(a) | Xi: T(a) | Xi: T(a) | Xi: T(a) | Xi: T(a) | Xi: T(a) | Xi: T(a) | Xi: T(a) |
| SNaN | Xi: T(a) | Xi: T(a) | Xi: T(a) | Xi: T(a) | Xi: T(a) | Xi: T(a) | Xi: T(a) | Xi: T(a) |

Explanation:

T(x)  The value x is placed at the target operand element location if no trapping exceptions on other elements.
M(x,y)  Return the lesser of floating point value x and y.
Fn  Finite nonzero number (includes both subnormal and normal).
Xi: IEEE invalid-operation exception. The results shown are produced only when FPC 0.0 is zero.

FIG. 4N

RESULTS FOR $M_6=4$

| Second | Results for VECTOR FP MINIMUM (a:b) when Third Operand (b) Is | | | | | | | |
|---|---|---|---|---|---|---|---|---|
| Operand (a) Is | -∞ | -Fn | -0 | +0 | +Fn | +∞ | QNaN | SNaN |
| -∞ | T(a) | T(a) | T(a) | T(a) | T(a) | T(a) | T(a) | Xi:T(a) |
| -Fn | T(b) | T(M(a,b)) | T(a) | T(a) | T(a) | T(a) | T(a) | Xi:T(a) |
| -0 | T(b) | T(b) | T(a) | T(a) | T(a) | T(a) | T(a) | Xi:T(a) |
| +0 | T(b) | T(b) | T(b) | T(a) | T(a) | T(a) | T(a) | Xi:T(a) |
| +Fn | T(b) | T(b) | T(b) | T(b) | T(M(a,b)) | T(a) | T(a) | Xi:T(a) |
| +∞ | T(b) | T(b) | T(b) | T(b) | T(b) | T(a) | T(a) | Xi:T(a) |
| QNaN | T(b) | T(b) | T(b) | T(b) | T(b) | T(b) | T(a) | Xi:T(a) |
| SNaN | Xi:T(b) | Xi:T(b) | Xi:T(b) | Xi:T(b) | Xi:T(b) | Xi:T(b) | Xi:T(a) | Xi:T(a) |

Explanation:

T(x) The value x is placed at the target operand element location if no trapping exceptions on other elements.
M(x,y) Return the lesser of floating point value x and y.
Fn Finite nonzero number (includes both subnormal and normal).
Xi: IEEE invalid-operation exception. The results shown are produced only when FPC 0.0 is zero.

FIG. 4O

RESULTS FOR $M_6=8$

| Second | Results for VECTOR FP MINIMUM (a:b) when Third Operand (b) Is | | | | | | | |
|---|---|---|---|---|---|---|---|---|
| Operand (a) Is | -∞ | -Fn | -0 | +0 | +Fn | +∞ | QNaN | SNaN |
| -∞ | T(a) | T(b) | T(b) | T(b) | T(b) | T(a) | T(a) | Xi: T(b*) |
| -Fn | T(a) | T(MS(a,b)) | T(b) | T(b) | T(MS(a,b)) | T(a) | T(a) | Xi: T(b*) |
| -0 | T(a) | T(a) | T(a) | T(a) | T(a) | T(a) | T(a) | Xi: T(b*) |
| +0 | T(a) | T(a) | T(b) | T(a) | T(a) | T(a) | T(a) | Xi: T(b*) |
| +Fn | T(a) | T(MS(a,b)) | T(b) | T(b) | T(MS(a,b)) | T(a) | T(a) | Xi: T(b*) |
| +∞ | T(b) | T(b) | T(b) | T(b) | T(b) | T(a) | T(a) | Xi: T(b*) |
| QNaN | T(b) | T(b) | T(b) | T(b) | T(b) | T(b) | T(a) | Xi: T(b*) |
| SNaN | Xi: T(a*) | Xi: T(a*) | Xi: T(a*) | Xi: T(a*) | Xi: T(a*) | Xi: T(a*) | Xi: T(a*) | Xi: T(a*) |

Explanation:

\* The SNaN is converted to the corresponding QNaN before it is placed in the target operand location.
T(x) The value x is placed at the target operand element location if no trapping exceptions on other elements.
M(x,y) Return the lesser of floating point value x and y.
MS(x,y) If |x| = |y| return M(x,y), return x if |x| < |y|; otherwise return y.
Fn Finite nonzero number (includes both subnormal and normal).
Xi: IEEE invalid-operation exception. The results shown are produced only when FPC 0.0 is zero.

FIG. 4P

RESULTS FOR $M_6=9$

| Second Operand (a) Is | Results for VECTOR FP MINIMUM (a:b) when Third Operand (b) Is | | | | |
|---|---|---|---|---|---|
| | 0 | Fn | ∞ | QNaN | SNaN |
| 0 | T(\|a\|) | T(\|a\|) | T(\|a\|) | T(\|b\|) | Xi: T(\|b*\|) |
| Fn | T(\|b\|) | T(M(\|a\|,\|b\|)) | T(\|a\|) | T(\|b\|) | Xi: T(\|b*\|) |
| ∞ | T(\|b\|) | T(\|b\|) | T(\|a\|) | T(\|b\|) | Xi: T(\|b*\|) |
| QNaN | T(\|a\|) | T(\|a\|) | T(\|a\|) | T(\|a\|) | Xi: T(\|b*\|) |
| SNaN | Xi: T(\|a*\|) | Xi: T(\|a*\|) | Xi: T(\|a*\|) | Xi: T(\|a*\|) | Xi: T(\|a*\|) |

Explanation:

\* The SNaN is converted to the corresponding QNaN before it is placed in the target operand location.
\|z\| The value of z is used with the sign forced to be positive.
T(x) The value x is placed at the target operand element location if no trapping exceptions on other elements.
M(x,y) Return the lesser of floating point value x and y.
Fn Finite nonzero number (includes both subnormal and normal).
Xi: IEEE invalid-operation exception. The results shown are produced only when FPC 0.0 is zero.

FIG. 4Q

RESULTS FOR $M_6=10$

| Second Operand (a) Is | Results for VECTOR FP MINIMUM (a:b) when Third Operand (b) Is | | | | |
|---|---|---|---|---|---|
| | 0 | Fn | ∞ | QNaN | SNaN |
| 0 | T(\|b\|) | T(\|a\|) | T(\|a\|) | Xi: T(\|b\|) | Xi: T(\|b\|) |
| Fn | T(\|b\|) | T(M(\|a\|,\|b\|)) | T(\|a\|) | Xi: T(\|b\|) | Xi: T(\|b\|) |
| ∞ | T(\|b\|) | T(\|b\|) | T(\|b\|) | Xi: T(\|b\|) | Xi: T(\|b\|) |
| QNaN | Xi: T(\|b\|) | Xi: T(\|b\|) | Xi: T(\|b\|) | Xi: T(\|b\|) | Xi: T(\|b\|) |
| SNaN | Xi: T(\|b\|) | Xi: T(\|b\|) | Xi: T(\|b\|) | Xi: T(\|b\|) | Xi: T(\|b\|) |

Explanation:

\|z\| The value of z is used with the sign forced to be positive.
T(x) The value x is placed at the target operand element location if no trapping exceptions on other elements.
M(x,y) Return the lesser of floating point value x and y.
Fn Finite nonzero number (includes both subnormal and normal).
Xi: IEEE invalid-operation exception. The results shown are produced only when FPC 0.0 is zero.

FIG. 4R

RESULTS FOR $M_6$=11

| Second Operand (a) Is | Results for VECTOR FP MINIMUM (a:b) when Third Operand (b) Is | | | | |
|---|---|---|---|---|---|
| | 0 | Fn | ∞ | QNaN | SNaN |
| 0 | T(\|a\|) | T(\|a\|) | T(\|a\|) | Xi: T(\|a\|) | Xi: T(\|a\|) |
| Fn | T(\|b\|) | T(M(\|a\|,\|b\|)) | T(\|a\|) | Xi: T(\|a\|) | Xi: T(\|a\|) |
| ∞ | T(\|b\|) | T(\|b\|) | T(\|a\|) | Xi: T(\|a\|) | Xi: T(\|a\|) |
| QNaN | Xi: T(\|a\|) | Xi: T(\|a\|) | Xi: T(\|a\|) | Xi: T(\|a\|) | Xi: T(\|a\|) |
| SNaN | Xi: T(\|a\|) | Xi: T(\|a\|) | Xi: T(\|a\|) | Xi: T(\|a\|) | Xi: T(\|a\|) |

Explanation:

|z|  The value of z is used with the sign forced to be positive.
T(x)  The value x is placed at the target operand element location if no trapping exceptions on other elements.
M(x,y)  Return the lesser of floating point value x and y.
Fn  Finite nonzero number (includes both subnormal and normal).
Xi:  IEEE invalid-operation exception. The results shown are produced only when FPC 0.0 is zero.

FIG. 4S

RESULTS FOR $M_6$=12

| Second Operand (a) Is | Results for VECTOR FP MINIMUM (a:b) when Third Operand (b) Is | | | | |
|---|---|---|---|---|---|
| | 0 | Fn | ∞ | QNaN | SNaN |
| 0 | T(\|a\|) | T(\|a\|) | T(\|a\|) | T(\|a\|) | Xi:T(\|a\|) |
| Fn | T(\|b\|) | T(M(\|a\|,\|b\|)) | T(\|a\|) | T(\|a\|) | Xi:T(\|a\|) |
| ∞ | T(\|b\|) | T(\|b\|) | T(\|a\|) | T(\|a\|) | Xi:T(\|a\|) |
| QNaN | T(\|b\|) | T(\|b\|) | T(\|b\|) | T(\|a\|) | Xi:T(\|a\|) |
| SNaN | Xi:T(\|b\|) | Xi:T(\|b\|) | Xi:T(\|b\|) | Xi:T(\|a\|) | Xi:T(\|a\|) |

Explanation:

T(x)  The value x is placed at the target operand element location if no trapping exceptions on other elements.
M(x,y)  Return the lesser of floating point value x and y.
Fn  Finite nonzero number (includes both subnormal and normal).
Xi:  IEEE invalid-operation exception. The results shown are produced only when FPC 0.0 is zero.

FIG. 4T

FLOATING POINT INSTRUCTION WITH SELECTABLE COMPARISON ATTRIBUTES

BACKGROUND

One or more aspects relate, in general, to processing within a computing environment, and in particular, to improving such processing.

In computing, floating point numbers are used to represent real numbers, and there are a number of representations used for floating point numbers. These representations include indications of how certain operations are to behave with floating point numbers. For example, the Institute of Electrical and Electronics Engineers (IEEE) provides a floating point standard which specifies the behavior for minimum and maximum operations on floating point numbers.

Although this standard exists, many programming languages and programmers have chosen not to follow this standard. Thus, there are several different standards and representations among the various programming languages within their libraries. Even within a language, the common convention may be to not use a library function, but to use some other language syntax that leads to differing behavior. This leads to difficulty in accelerating these operations in hardware and often requires a sequence of many instructions including several conditional branches to emulate.

SUMMARY

Shortcomings of the prior art are overcome and additional advantages are provided through the provision of a computer program product for facilitating processing in a computing environment. The computer program product comprises a storage medium readable by a processing circuit and storing instructions for execution by the processing circuit for performing a method. The method includes, for instance, obtaining an instruction to be executed, the instruction to perform a comparison of a first value and a second value; and executing the instruction. The executing includes determining, based on a control of the instruction, a compare function to be performed, wherein the compare function is one of a plurality of compare functions configured for the instruction and wherein the compare function has a plurality of options for comparison; selecting from the plurality of options for the compare function, a compare option to be used to compare the first value and the second value, the compare option selected based on the first value and the second value; comparing the first value and the second value using the compare option to obtain a result, the result specific for the compare option selected for the compare function indicated by the control of the instruction; and placing the result in a select location, the result to be used in processing within the computing environment.

The number of instructions used to perform comparison operations for differing standards and/or representations is reduced, thereby improving processing within a computing environment.

In one example, the plurality of options include a plurality of pairs of particular cases selectable for comparison. The plurality of pairs of particular cases include at least one pair of particular cases that includes at least one particular case selected from the group of particular cases including: an infinity, a not-a-number (NAN), and a signed zero.

Further, in one example, the plurality of compare functions include at least one of a plurality of maximum functions and a plurality of minimum functions. The plurality of maximum functions include a plurality of maximum techniques to perform a maximum comparison, and the plurality of minimum functions include a plurality of minimum techniques to perform a minimum comparison.

As examples, the first value and the second value are provided by the instruction, and the first value is of one element of an operand of the instruction and the second value is of a corresponding element of another operand of the instruction.

Moreover, in one example, a size of the one element is determined based on another control of the instruction. Further, as examples, the first value and the second value are floating point values, and the size of the one element depends on a floating point format of the floating point values. The other control indicates a selected floating point format.

In one example, the control is provided in a mask of the instruction.

Methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIGS. 4A-4T depict tables of compare options for particular compare functions, in accordance with aspects of the present invention;

DETAILED DESCRIPTION

Figure 1A:
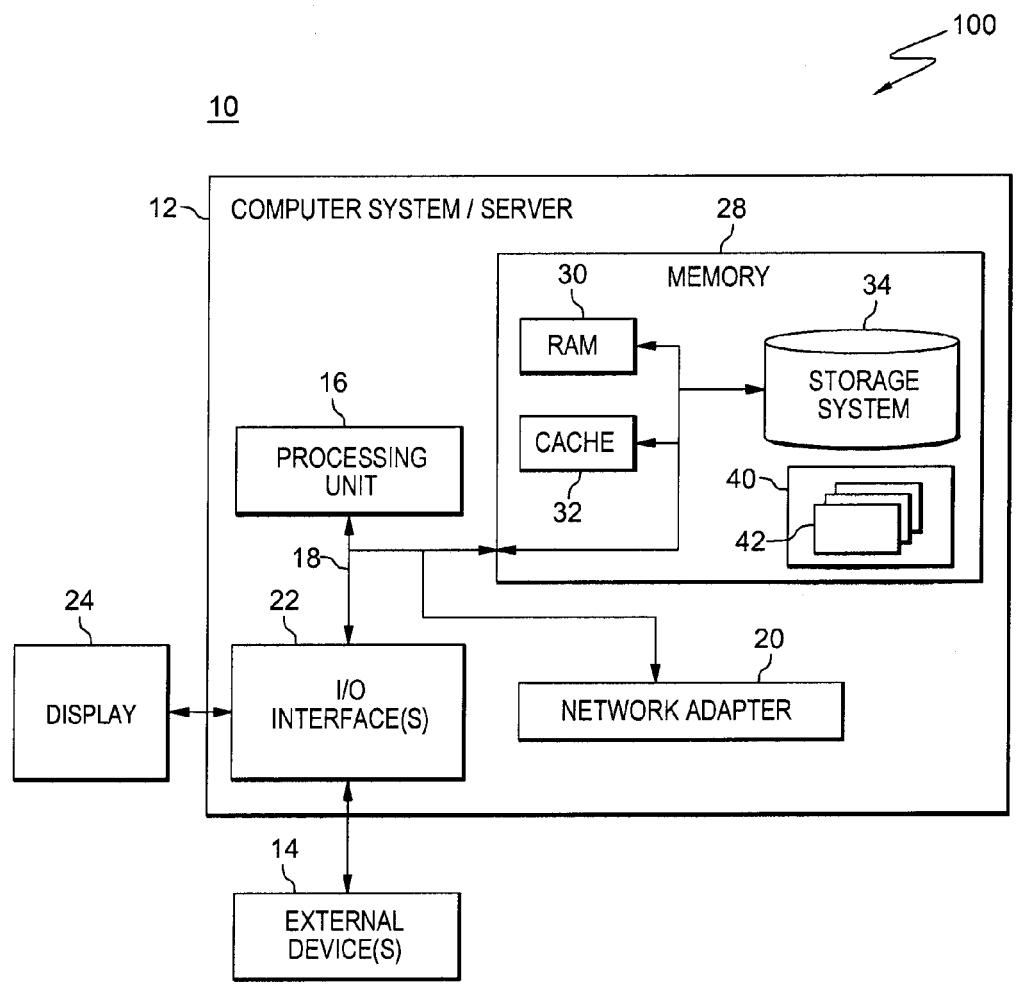
FIG. 1A depicts one example of a computing environment to incorporate and use one or more aspects of the present invention.

One or more aspects relate to improving processing within a computing environment by providing a capability for reducing the number of instructions to perform floating point maximum and minimum operations for differing standards and/or representations. As indicated herein, there are a number of different standards and representations for floating point numbers among the various programming languages. Even within a language, the common convention may be to not use a library function, but to use some other language syntax that leads to differing behavior. Some of the differing aspects of the comparisons (i.e., special or particular cases) are whether to consider +0 greater than −0 or to consider them equal, how to handle comparisons with NaNs (Not-a-Number), whether to signal an exception on a SNaN (signaling NaN), how to handle infinity, whether to convert a SNaN to a QNaN (quiet NaN) in the result, which NaN payload takes precedence if both inputs are NaNs, etc.

There have been different floating point maximum and minimum instructions developed over the years; however, these instructions fail to capture all of the permutations for the special cases for the different representations. Instead, for each of the maximum and minimum operations, there is a number of instructions to capture different permutations. Thus, in accordance with an aspect of the present invention, a single instruction (e.g., a single architected machine instruction at the hardware/software interface) is provided that includes various maximum functions, each handling various options to cover many permutations. Further, a single instruction (e.g., a single architected machine instruction at the hardware/software interface) is provided that includes various minimum functions, each handling various options to cover many permutations. By using these two instructions to cover the different permutations for maximum and minimum, the number of instructions to handle the permutations is reduced, thereby improving processing and performance.

In a further embodiment, a single instruction (e.g., a single architected machine instruction at the hardware/software level) is provided that supports various functions of maximum and minimum operations and the differing options. By providing a single instruction to handle the differing permutations for both maximum and minimum operations, the number of instructions needed is further reduced to one instruction, thereby reducing the number of instructions to be encoded, and improving system performance.

One embodiment of a computing environment to incorporate and use one or more aspects of the present invention is described with reference to FIG. 1A. In one example, the computing environment is based on the z/Architecture, offered by International Business Machines Corporation, Armonk, N.Y. One embodiment of the z/Architecture is described in "z/Architecture Principles of Operation," IBM Publication No. SA22-7832-10, March 2015, which is hereby incorporated herein by reference in its entirety. Z/ARCHITECTURE is a registered trademark of International Business Machines Corporation, Armonk, N.Y., USA.

In another example, the computing environment is based on the Power Architecture, offered by International Business Machines Corporation, Armonk, N.Y. One embodiment of the Power Architecture is described in "Power ISA™ Version 2.07B," International Business Machines Corporation, Apr. 9, 2015, which is hereby incorporated herein by reference in its entirety. POWER ARCHITECTURE is a registered trademark of International Business Machines Corporation, Armonk, N.Y., USA.

The computing environment may also be based on other architectures, including, but not limited to, the Intel x86 architectures. Other examples also exist.

As shown in FIG. 1A, a computing environment 100 includes, for instance, a node 10 having, e.g., a computer system/server 12, which is operational with numerous other general purpose or special purpose computing system environments or configurations. Examples of well-known computing systems, environments, and/or configurations that may be suitable for use with computer system/server 12 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in many computing environments, including but not limited to, distributed cloud computing environments where tasks are performed by remote processing devices that are linked through a communications network. In a distributed cloud computing environment, program modules may be located in both local and remote computer system storage media including memory storage devices.

As shown in FIG. 1A, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 1B:
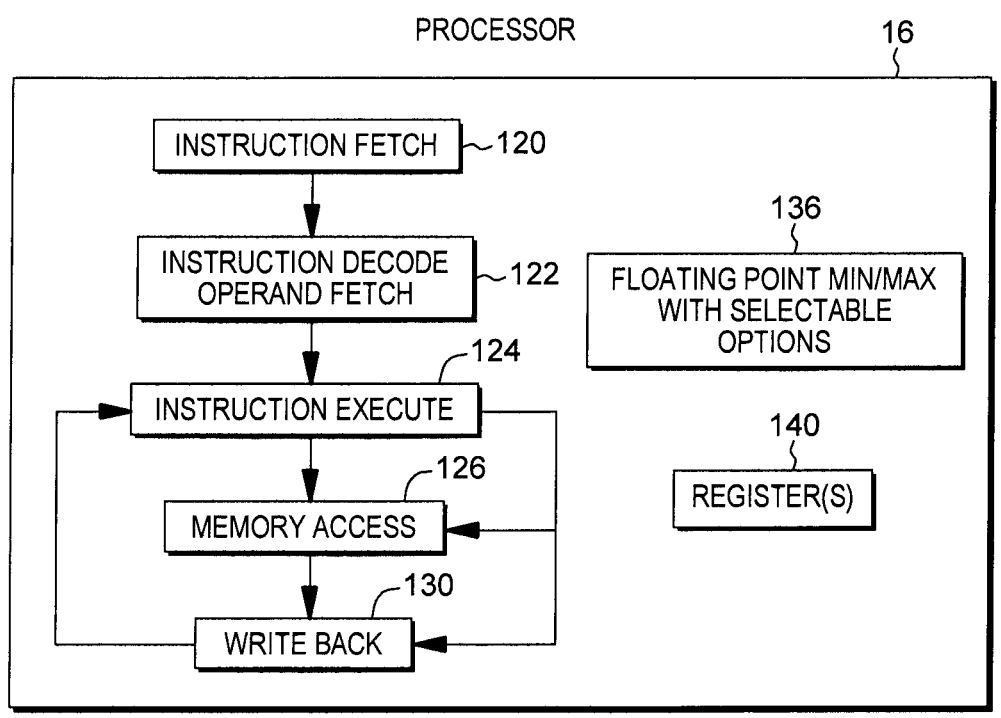
FIG. 1B depicts further details of the processor of FIG. 1A, in accordance with an aspect of the present invention.

As an example, processor 16 includes a plurality of functional components used to execute instructions. As depicted in FIG. 1B, these functional components include, for instance, an instruction fetch component 120 to fetch instructions to be executed; an instruction decode unit 122 to decode the fetched instructions and to obtain operands of the decoded instructions; instruction execution components 124 to execute the decoded instructions; a memory access component 126 to access memory for instruction execution, if necessary; and a write back component 130 to provide the results of the executed instructions. One or more of these components may, in accordance with an aspect of the present invention, be used to perform floating point maximum/minimum operations with selectable options 136, as described further below.

Processor 16 also includes, in one embodiment, one or more registers 140 to be used by one or more of the functional components.

Figure 2A:
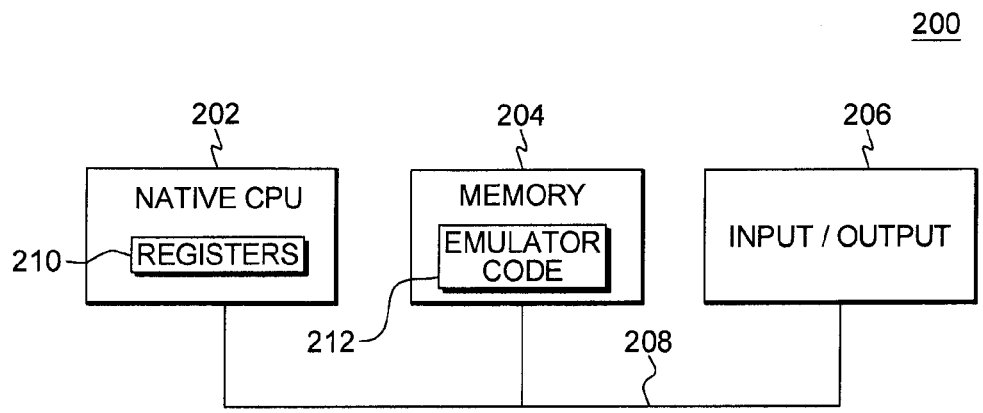
FIG. 2A depicts another example of a computing environment to incorporate and use one or more aspects of the present invention.

Another embodiment of a computing environment to incorporate and use one or more aspects is described with reference to FIG. 2A. In this example, a computing environment 200 includes, for instance, a native central processing unit (CPU) 202, a memory 204, and one or more input/output devices and/or interfaces 206 coupled to one another via, for example, one or more buses 208 and/or other connections. As examples, computing environment 200 may include a PowerPC processor or a pSeries server offered by International Business Machines Corporation, Armonk, N.Y.; an HP Superdome with Intel Itanium II processors offered by Hewlett Packard Co., Palo Alto, Calif.; and/or other machines based on architectures offered by International Business Machines Corporation, Hewlett Packard, Intel, Oracle, or others.

Native central processing unit 202 includes one or more native registers 210, such as one or more general purpose registers and/or one or more special purpose registers used during processing within the environment. These registers include information that represent the state of the environment at any particular point in time.

Moreover, native central processing unit 202 executes instructions and code that are stored in memory 204. In one particular example, the central processing unit executes emulator code 212 stored in memory 204. This code enables the computing environment configured in one architecture to emulate another architecture. For instance, emulator code 212 allows machines based on architectures other than the z/Architecture, such as PowerPC processors, pSeries servers, HP Superdome servers or others, to emulate the z/Architecture and to execute software and instructions developed based on the z/Architecture.

Figure 2B:
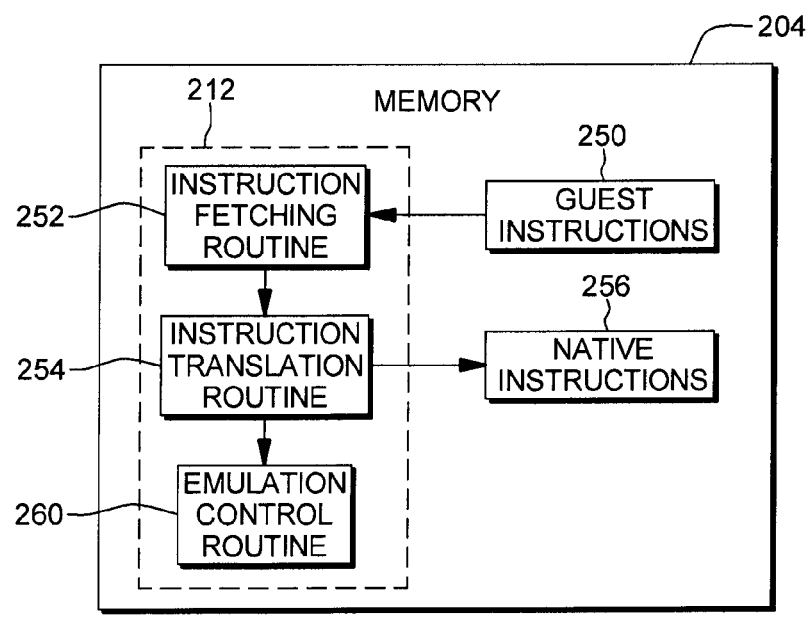
FIG. 2B depicts further details of the memory of FIG. 2A.

Further details relating to emulator code 212 are described with reference to FIG. 2B. Guest instructions 250 stored in memory 204 comprise software instructions (e.g., correlating to machine instructions) that were developed to be executed in an architecture other than that of native CPU 202. For example, guest instructions 250 may have been designed to execute on a z/Architecture processor, but instead, are being emulated on native CPU 202, which may be, for example, an Intel Itanium II processor. In one example, emulator code 212 includes an instruction fetching routine 252 to obtain one or more guest instructions 250 from memory 204, and to optionally provide local buffering for the instructions obtained. It also includes an instruction translation routine 254 to determine the type of guest instruction that has been obtained and to translate the guest instruction into one or more corresponding native instructions 256. This translation includes, for instance, identifying the function to be performed by the guest instruction and choosing the native instruction(s) to perform that function.

Further, emulator 212 includes an emulation control routine 260 to cause the native instructions to be executed. Emulation control routine 260 may cause native CPU 202 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 256 may include loading data into a register from memory 204; storing data back to memory from a register; or performing some type of arithmetic or logic operation, as determined by the translation routine.

Each routine is, for instance, implemented in software, which is stored in memory and executed by native central processing unit 202. In other examples, one or more of the routines or operations are implemented in firmware, hardware, software or some combination thereof. The registers of the emulated processor may be emulated using registers 210 of the native CPU or by using locations in memory 204. In embodiments, guest instructions 250, native instructions 256 and emulator code 212 may reside in the same memory or may be disbursed among different memory devices.

As used herein, firmware includes, e.g., the microcode, millicode and/or macrocode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

A guest instruction 250 that is obtained, translated and executed is, for instance, a Vector Floating Point Maximum instruction, a Vector Floating Point Minimum instruction, and/or a Vector Floating Point Maximum/Minimum instruction, described herein. The instruction, which is of one architecture (e.g., the z/Architecture), is fetched from memory, translated and represented as a sequence of native instructions 256 of another architecture (e.g., PowerPC, pSeries, Intel, etc.). These native instructions are then executed.

Details relating to one embodiment of a Vector Floating Point Maximum instruction, a Vector Floating Point Minimum instruction and a Vector Floating Point Maximum/Minimum instruction, including fields of the instructions and execution by a processor (either in a native or emulated system) are described herein. In accordance with an aspect of the present invention, the Vector Floating Point Maximum instruction performs comparisons of values to determine the greater of multiple values, and handles a plurality of special comparison cases (also referred to herein as particular cases). By using one single instruction (e.g., a single architected machine instruction) to handle multiple special cases in maximum comparisons, the number of instructions needed to handle the special cases for maximum comparisons is reduced to one; thus improving computer processing.

Similarly, the Vector Floating Point Minimum instruction performs comparisons of values to determine the lesser of multiple values, and handles a plurality of special comparison cases. By using one single instruction (e.g., a single architected machine instruction) to handle multiple special cases in minimum comparisons, the number of instructions needed to handle the special cases for minimum comparisons is reduced to one; thus improving computer processing.

Yet further, the Vector Floating Point Maximum/Minimum instruction performs comparisons of values to determine the greater/lesser of multiple values, respectively, each handling a plurality of special comparison cases. By using one single instruction (e.g., single architected machine instruction), the number of instructions needed to handle the different permutations is reduced to one; thus improving computer processing. Aspects of the invention are inextricably tied to computer technology, and to the improvement of computer processing.

In one embodiment, one or more of the Vector Floating Point Maximum instruction, the Vector Floating Point Minimum instruction, and the Vector Floating Point Maximum/Minimum instruction, are a part of a vector facility, which provides, for instance, fixed sized vectors ranging from one to sixteen elements. Each vector includes data which is operated on by vector instructions defined in the facility. In one embodiment, if a vector is made up of multiple elements, then each element is processed in parallel with the other elements. Instruction completion does not occur until processing of all the elements is complete. In other embodiments, the elements are processed partially in parallel and/or sequentially.

Vector instructions can be implemented as part of various architectures, including, but not limited to, the z/Architecture, the Power Architecture, x86, IA-32, IA-64, etc. Although embodiments described herein are for the z/Architecture, the vector instructions described herein and one or more other aspects may be based on many other architectures. The z/Architecture is only one example.

In one embodiment in which the vector facility is implemented as part of the z/Architecture, to use the vector registers and instructions, a vector enablement control and a register control in a specified control register (e.g., control register 0) are set to, for instance, one. If the vector facility is installed and a vector instruction is executed without the enablement controls set, a data exception is recognized. If the vector facility is not installed and a vector instruction is executed, an operation exception is recognized.

In one embodiment, there are 32 vector registers and other types of registers can map to a quadrant of the vector registers. For instance, a register file may include 32 vector registers and each register is 128 bits in length. Sixteen floating point registers, which are 64 bits in length, can overlay the vector registers. Thus, as an example, when floating point register 2 is modified, then vector register 2 is also modified. Other mappings for other types of registers are also possible.

Vector data appears in storage, for instance, in the same left-to-right sequence as other data formats. Bits of a data format that are numbered 0-7 constitute the byte in the leftmost (lowest-numbered) byte location in storage, bits 8-15 form the byte in the next sequential location, and so on. In a further example, the vector data may appear in storage in another sequence, such as right-to-left.

One example of a Vector Floating Point Maximum instruction is described with reference to FIG. 3A. As shown, the instruction has a plurality of fields, and a field may have a subscript number associated therewith. The subscript number associated with a field of the instruction denotes the operand to which the field applies. For instance, the subscript number 1 associated with vector register $V_1$ denotes that the register in $V_1$ includes the first operand, and so forth. A register operand is one register in length, which is, for instance, 128 bits.

Figure 3A:
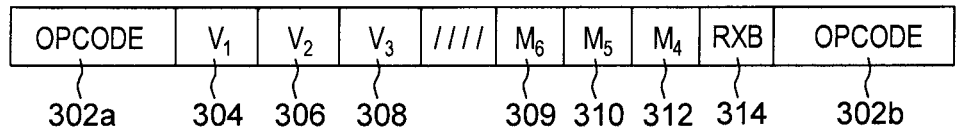
FIG. 3A depicts one example of a Vector Floating Point Maximum instruction, in accordance with an aspect of the present invention.

Referring to FIG. 3A, in one embodiment, a Vector Floating Point Maximum instruction 300 includes opcode fields 302a, 302b indicating a vector floating point maximum operation; a first vector register field 304 used to designate a first vector register ($V_1$); a second vector register field 306 used to designate a second vector register ($V_2$); a third vector register field 308 used to designate a third vector register ($V_3$); a first mask field ($M_6$) 309; a second mask field ($M_5$) 310; a third mask field ($M_4$) 312; and a register extension bit (RXB) field 314, each of which is described below. In one embodiment, the fields are separate and independent from one another; however, in other embodiments, more than one field may be combined. Further information regarding these fields is described below.

Vector register field 304 is used to indicate a vector register that is to store the first operand, the first operand being a result of comparing values of elements of two operands to obtain the greater of the two values of the elements. The operand elements are, e.g., treated as (IEEE) binary floating point (BFP) numbers of the specified format. The two operands are the second operand contained in the vector register specified using vector register field 306 and the third operand contained in the vector register specified using vector register field 308. In one example, each of vector register fields 304, 306, 308 is used with RXB field 314 to designate the vector register.

For instance, RXB field 314 includes the most significant bit for a vector register designated operand. Bits for register designations not specified by the instruction are to be reserved and set to zero. The most significant bit is concatenated, for instance, to the left of the four-bit register designation of the vector register field to create a five-bit vector register designation.

In one example, the RXB field includes four bits (e.g., bits 0-3), and the bits are defined, as follows:

0—Most significant bit for the first vector register designation (e.g., in bits 8-11) of the instruction.

1—Most significant bit for the second vector register designation (e.g., in bits 12-15) of the instruction, if any.

2—Most significant bit for the third vector register designation (e.g., in bits 16-19) of the instruction, if any.

3—Most significant bit for the fourth vector register designation (e.g., in bits 32-35) of the instruction, if any.

Each bit is set to zero or one by, for instance, the assembler depending on the register number. For instance, for registers 0-15, the bit is set to 0; for registers 16-31, the bit is set to 1, etc.

In one embodiment, each RXB bit is an extension bit for a particular location in an instruction that includes one or more vector registers. For instance, bit 0 of RXB is an extension bit for location 8-11, which is assigned to, e.g., $V_1$ and so forth. In particular, for vector registers, the register containing the operand is specified using, for instance, a four-bit field of the register field with the addition of its corresponding register extension bit (RXB) as the most significant bit. For instance, if the four bit field is 0110 and the extension bit is 0, then the five bit field 00110 indicates register number 6. In a further embodiment, the RXB field includes additional bits, and more than one bit is used as an extension for each vector or location.

$M_6$ field 309 specifies the handling of special cases (also referred to herein as particular cases) for the comparison. Detailed descriptions of the results for each element are shown in FIGS. 4A-4J. If a reserved value is specified, a specification exception is recognized, in one example.

| $M_6$ | Maximum Function Performed |
|---|---|
| 0 | IEEE MaxNum |
| 1 | Java Math.Max( ) |
| 2 | C-Style Max Macro |
| 3 | C++ Algorithm.max( ) |
| 4 | fmax( ) |
| 5-7 | Reserved |
| 8 | IEEE MaxNumMag |
| 9 | Java Math.Max( ) of absolute values |
| 10 | C-Style Max Macro of absolute values |
| 11 | C++ Algorithm.max( ) of absolute values |
| 12 | fmax( ) of absolute values |
| 13-15 | Reserved |

The $M_4$ field 312 specifies the floating point format. The floating point format determines the size of the elements within the vector register operands. If a reserved value is specified, a specification exception is recognized, in one example.

| M4 | Floating Point Format |
|---|---|
| 0-1 | Reserved |
| 2 | Short format |
| 3 | Long format |
| 4 | Extended format |
| 5-15 | Reserved |

Figure 3B:
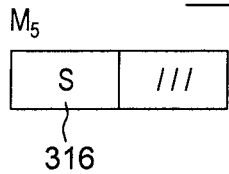
FIG. 3B depicts one embodiment of a mask field of the Vector Floating Point Maximum instruction of FIG. 3A, in accordance with an aspect of the present invention.

$M_5$ field 310 includes, in one example, the following controls, as depicted in FIG. 3B:

Single Element Control (S) 316: If bit 0 is set to one, the operation takes place only on the zero-indexed element in the vector. In the absence of a trapping exception condition, the bit positions of all other elements in the first operand vector are unpredictable, in one embodiment. The values of all other elements in the second and third operands are ignored. If bit 0 is set to zero, the operation occurs on all elements in the vector.

Reserved: Bits 1, 2 and 3 are reserved and are to be zero. Otherwise, a specification exception is recognized, in one example.

Although various fields and registers are described, one or more aspects of the present invention may use other, additional or less fields or registers, or other sizes of fields or registers, etc. Many variations are possible. For instance, implied registers may be used instead of explicitly specified registers or fields of the instruction. Further, registers other than vector registers may be used. Again, other variations are also possible.

In operation of one embodiment of the Vector Floating Point Maximum instruction, the floating point element or elements of the second operand are compared to the corresponding floating point element or elements of the third operand, as shown in FIGS. 4A-4J. The greater of the two values is placed in the corresponding element of the first operand. The operand elements are all treated as BFP numbers of the specified format.

The comparison performed and the result thereof depends on the compare function selected (e.g., indicated by $M_6$) and the compare options for the particular compare function being performed. A compare option (e.g., a pair including any two of the following cases: −∞, +∞, −FN, +FN, −0, +0, QNAN, SNAN, as examples, where FN is finite number) is selected based on the values of the second and third operand elements being compared. Each compare function may have different compare options associated therewith, and the result for a compare option depends on the particular compare function being performed. Different results may be specified for the same compare options for different compare functions. For instance, if $M_6$=0, and the second and third operand values being compared are −0, +0, then the result is +0 (see FIG. 4A); however, if $M_6$=3, and the second and third operand values are still −0, +0, the result is −0 (see FIG. 4D). Many variations are possible.

In one embodiment, depending on the maximum function performed, if any of the floating point elements in the second or third operand are NaNs, an IEEE invalid-operation exception may be recognized, as specified in FIGS. 4A-4J. If an IEEE invalid-operation mask bit is one, a program interruption with VXC set for IEEE invalid-operation and the corresponding element index occurs and the operation is suppressed, in one example.

In a further embodiment, a field of the instruction (e.g., an explicit field of the instruction, such as $M_6$ or another selected field, or an implicit field of the instruction) includes a plurality of bits and each bit is a selector that when set (e.g., to one) defines a different compare option. For instance, bit 0 when set indicates a sign is to be ignored; bit 1 when set indicates to signal on SNAN; bit 2 when set indicates which value of e.g., +0, −0, to select; bit 3 when set indicates which value of, e.g., ∞, −FN to select, etc. Many different options may be represented by the different bits. By having the different bits correspond to different options, one or more bits may be set to provide many different compare options and results using a single instruction.

Figure 3C:
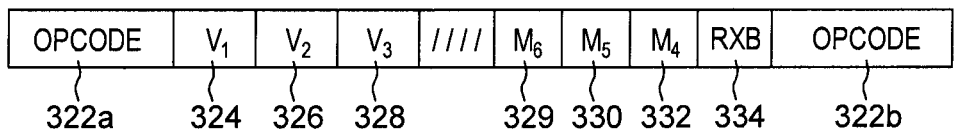
FIG. 3C depicts one example of a Vector Floating Point Minimum instruction, in accordance with an aspect of the present invention.

In a further embodiment, a Vector Floating Point Minimum instruction is provided, and described with reference to FIG. 3C. In one embodiment, a Vector Floating Point Minimum instruction 320 includes opcode fields 322a, 322b indicating a vector floating point minimum operation; a first vector register field 324 used to designate a first vector register ($V_1$); a second vector register field 326 used to designate a second vector register ($V_2$); a third vector register field 328 used to designate a third vector register ($V_3$); a first mask field ($M_6$) 329; a second mask field ($M_5$) 330; a third mask field ($M_4$) 332; and a register extension bit (RXB) field 334, each of which is described herein. In one embodiment, the fields are separate and independent from one another; however, in other embodiments, more than one field may be combined. Further information regarding these fields is described below.

Vector register field 324 is used to indicate a vector register that is to store the first operand, the first operand being a result of comparing values of elements of two operands to obtain the lesser of the two values of the elements. The operand elements are, e.g., treated as binary floating point numbers of the specified format. The two operands are the second operand contained in the vector register specified using vector register field 326 and the third operand contained in the vector register specified using vector register field 328. In one example, each of vector register fields 324, 326, 328 is used with RXB field 334 to designate the vector register, as described above.

In this embodiment, $M_6$ field 329 specifies the handling of special cases (also referred to herein as particular cases) for the comparison. Detailed descriptions of the results for each element are shown in FIGS. 4K-4T. If a reserved value is specified, a specification exception is recognized, in one example.

| $M_6$ | Minimum Function Performed |
| --- | --- |
| 0 | IEEE MinNum |
| 1 | Java Math.Min( ) |
| 2 | C-Style Min Macro |
| 3 | C++ Algorithm.min( ) |
| 4 | fmin( ) |
| 5-7 | Reserved |
| 8 | IEEE MinNum of absolute values |
| 9 | Java Math.Min( ) of absolute values |
| 10 | C-Style Min Macro of absolute values |
| 11 | C++ Algorithm.min( ) of absolute values |
| 12 | fmin( ) of absolute values |
| 13-15 | Reserved |

The $M_4$ field 332 specifies the floating point format. The floating point format determines the size of the elements within the vector register operands. If a reserved value is specified, a specification exception is recognized, in one example.

| M4 | Floating-Point Format |
| --- | --- |
| 0-1 | Reserved |
| 2 | Short format |
| 3 | Long format |
| 4 | Extended format |
| 5-15 | Reserved |

$M_5$ field 330 includes, in one example, the following controls, as depicted in FIG. 3B:

Single Element Control (S) 316: If bit 0 is set to one, the operation takes place only on the zero-indexed element in the vector. In the absence of a trapping exception condition, the bit positions of all other elements in the first operand vector are unpredictable, in one embodiment. The values of all other elements in the second and third operands are ignored. If bit 0 is set to zero, the operation occurs on all elements in the vector.

Although various fields and registers are described, one or more aspects of the present invention may use other, additional or less fields or registers, or other sizes of fields or registers, etc. Many variations are possible. For instance, implied registers may be used instead of explicitly specified registers or fields of the instruction. Further, registers other than vector registers may be used. Again, other variations are also possible.

In operation of one embodiment of the Vector Floating Point Minimum instruction, the floating point element or elements of the second operand are compared to the corresponding floating point element or elements of the third operand. The lesser of the two values is placed in the corresponding element of the first operand. The operand elements are all treated as BFP numbers of the specified format.

The comparison performed and the result thereof depends on the compare function selected (e.g., indicated by $M_6$) and the compare options for the particular compare function being performed. A compare option (e.g., a pair including any two of the following cases: −∞, +∞, −FN, +FN, −0, +0, QNAN, SNAN, as examples, where FN is finite number) is selected based on the values of the second and third operand elements being compared. Each compare function may have different compare options associated therewith, and the result for a compare option depends on the particular compare function being performed. Different results may be specified for the same compare options for different compare functions.

In one example, depending on the minimum function performed, if any of the floating point elements in the second or third operand are NaNs, an IEEE invalid-operation exception may be recognized, as specified in FIGS. 4K-4T. If an IEEE invalid-operation mask bit is one, a program interruption with VXC set for IEEE invalid-operation and the corresponding element index occurs and the operation is suppressed, in one example.

Figure 3D:
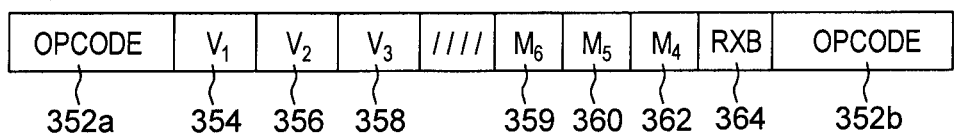
FIG. 3D depicts one example of a Vector Floating Point Maximum/Minimum instruction, in accordance with an aspect of the present invention.

In yet another embodiment, one instruction may be provided in which maximum/minimum is, e.g., a selectable control of the instruction. One example of a Vector Floating Point Maximum/Minimum instruction 350 is described with reference to FIG. 3D. In one embodiment, a Vector Floating Point Maximum/Minimum instruction 350 includes opcode fields 352a, 352b indicating a vector floating point maximum/minimum operation; a first vector register field 354 used to designate a first vector register ($V_1$); a second vector register field 356 used to designate a second vector register ($V_2$); a third vector register field 358 used to designate a third vector register ($V_3$); a first mask field ($M_6$) 359; a second mask field ($M_5$) 360; a third mask field ($M_4$) 362; and a register extension bit (RXB) field 364, each of which is described herein. In one embodiment, the fields are separate and independent from one another; however, in other embodiments, more than one field may be combined. Further information regarding these fields is described below.

Vector register field 354 is used to indicate a vector register that is to store the first operand, the first operand being a result of comparing values of elements of two operands to obtain the greater/lesser of the two values of the elements, depending on the selected function, maximum or minimum. The operand elements are, e.g., treated as binary floating point numbers of the specified format. The two operands are the second operand contained in the vector register specified using vector register field 356 and the third operand contained in the vector register specified using vector register field 358. In one example, each of vector register fields 354, 356, 358 is used with RXB field 364 to designate the vector register, as described above.

In this embodiment, $M_6$ field 359 specifies the handling of special cases (also referred to herein as particular cases) for the comparison. Detailed descriptions of the results for each element are shown in FIGS. 4A-4T. If a reserved value is specified, a specification exception is recognized, in one example. The function performed depends on whether a maximum or minimum operation is performed, as well as the respective $M_6$ value below.

| $M_6$ | Function Performed |
|---|---|
| 0 | IEEE MaxNum |
| 0 | IEEE MinNum |
| 1 | Java Math.Max( ) |
| 1 | Java Math.Min( ) |
| 2 | C-Style Max Macro |
| 2 | C-Style Min Macro |
| 3 | C++ Algorithm.max( ) |
| 3 | C++ Algorithm.min( ) |
| 4 | fmax( ) |
| 4 | fmin( ) |
| 5-7 | Reserved |
| 5-7 | Reserved |
| 8 | IEEE MaxNumMag |
| 8 | IEEE MinNum of absolute values |
| 9 | Java Math.Max( ) of absolute values |
| 9 | Java Math.Min( ) of absolute values |
| 10 | C-Style Max Macro of absolute values |
| 10 | C-Style Min Macro of absolute values |
| 11 | C++ Algorithm.max( ) of absolute values |
| 11 | C++ Algorithm.min( ) of absolute values |
| 12 | fmax( ) of absolute values |
| 12 | fmin( ) of absolute values |
| 13-15 | Reserved |
| 13-15 | Reserved |

In a further embodiment, there may be separate numbers for each maximum/minimum function supported.

The $M_4$ field 362 specifies the floating point format. The floating point format determines the size of the elements within the vector register operands. If a reserved value is specified, a specification exception is recognized, in one example.

| M4 | Floating-Point Format |
|---|---|
| 0-1 | Reserved |
| 2 | Short format |
| 3 | Long format |
| 4 | Extended format |
| 5-15 | Reserved |

$M_5$ field 360 includes, in one example, the following controls, as depicted in FIG. 3B:

Single Element Control (S) 316: If bit 0 is set to one, the operation takes place only on the zero-indexed element in the vector. In the absence of a trapping exception condition, the bit positions of all other elements in the first operand vector are unpredictable, in one embodiment. The values of all other elements in the second and third operands are ignored. If bit 0 is set to zero, the operation occurs on all elements in the vector.

Although various fields and registers are described, one or more aspects of the present invention may use other, additional or less fields or registers, or other sizes of fields or registers, etc. Many variations are possible. For instance, implied registers may be used instead of explicitly specified registers or fields of the instruction. Further, registers other than vector registers may be used. Again, other variations are also possible.

In operation of one embodiment of the Vector Floating Point Maximum/Minimum instruction, the floating point element or elements of the second operand are compared to the corresponding floating point element or elements of the third operand. The greater or lesser of the two values, depending on whether a maximum or minimum function is being performed, is placed in the corresponding element of the first operand. The operand elements are all treated as BFP numbers of the specified format.

The comparison performed and the result thereof depends on the compare function selected (e.g., indicated by $M_6$) and the compare options for the particular compare function being performed. A compare option (e.g., a pair including any two of the following cases: $-\infty$, $+\infty$, $-FN$, $+FN$, $-0$, $+0$, QNAN, SNAN, as examples, where FN is finite number) is selected based on the values of the second and third operand elements being compared. Each compare function may have different compare options associated therewith, and the result for a compare option depends on the particular compare function being performed.

In one embodiment, depending on the function performed, if any of the floating point elements in the second or third operand are NaNs, an IEEE invalid-operation exception may be recognized, as specified in FIGS. 4A-4T. If an IEEE invalid-operation mask bit is one, a program interruption with VXC set for IEEE invalid-operation and the corresponding element index occurs and the operation is suppressed, in one example.

Further details regarding operation of a Vector Floating Point Maximum, Minimum and/or Maximum/Minimum instruction are described with reference to FIG. 5. In one example, the processing of FIG. 5 is performed by at least one processor based on obtaining and executing one of the instructions.

Figure 5:
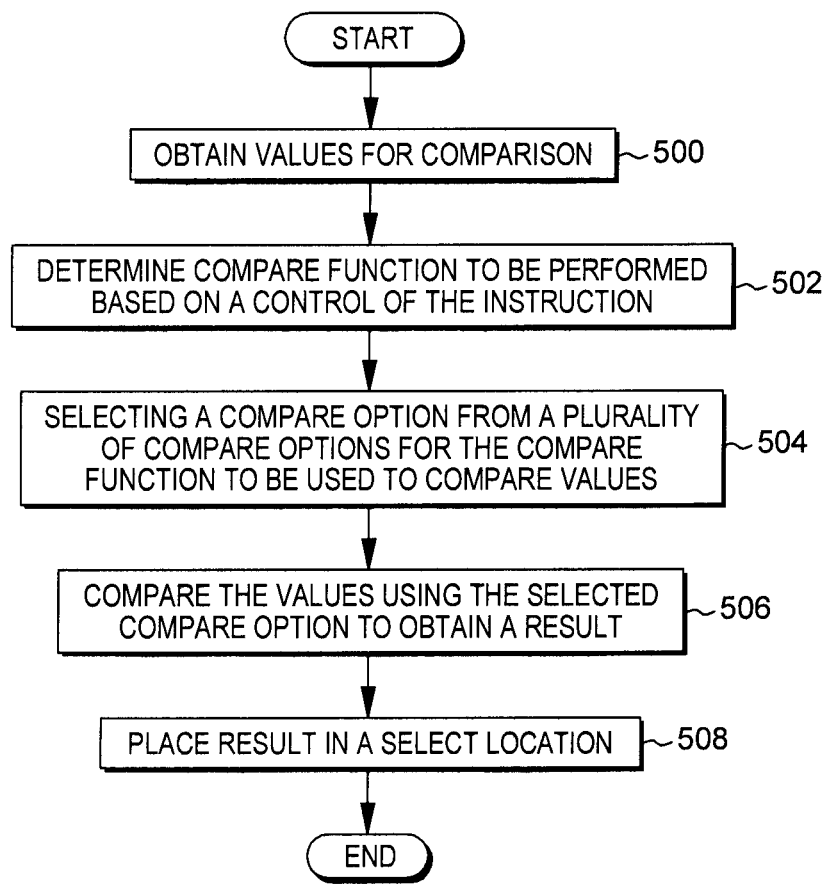
FIG. 5 depicts one example of a block diagram of processing associated with executing a vector floating point maximum and/or minimum instruction, in accordance with an aspect of the present invention.

Referring to FIG. 5, initially a first value and a second value to be compared are obtained, STEP 500. In one example, the first value is of an element of operand two and the second value is of a corresponding element of operand three. (In other embodiments, multiple values of multiple elements are compared in parallel or sequentially).

A determination is made of the compare function that is to be performed based on a control of the instruction, STEP 502. For instance, if the instruction is the Vector Floating Point Maximum instruction and $M_6=0$, then an IEEE MaxNum function is performed. Similarly, if the instruction is the Vector Floating Point Minimum instruction and $M_6=0$, then an IEEE MinNum function is performed. Likewise, if the instruction is the Vector Floating Point Maximum/Minimum instruction and $M_6=0$, then an IEEE MaxNum function is performed if the instruction is to perform a maximum operation or an IEEE MinNum function is performed, if the instruction is to perform a minimum operation. Many other examples are possible.

Thereafter, for the selected compare function (e.g., IEEE MaxNum, IEEE MinNum, etc.), a compare option, based on the first value and the second value, is selected from a plurality of compare options for the particular selected compare function, STEP 504. For instance, if an IEEE MaxNum function is being performed (e.g., $M_6=0$), and the first value is −0 (a) and the second value is + (b), then that pair is selected from the options provided for the IEEE MaxNum function (see FIG. 4A). The values are compared using the selected compare option to obtain a result, STEP 506. For instance, at the intersection of the inputs values (−0, +∞) in FIG. 4A is the comparison result for an IEEE MaxNum function. Thus, the obtained result in this particular example is T(b), in which the value of operand three is indicated as the result of the comparison. This result is placed in a select location, STEP 508. For instance, it is placed in the register specified using $V_1$. In a further example, however, it may be placed in a memory location or other location.

Further details relating to facilitating processing within a computing environment, including executing an instruction to perform a Vector Floating Point Maximum, Minimum and/or Maximum/Minimum instruction, are described with reference to FIGS. 6A-6B.

Figure 6A:
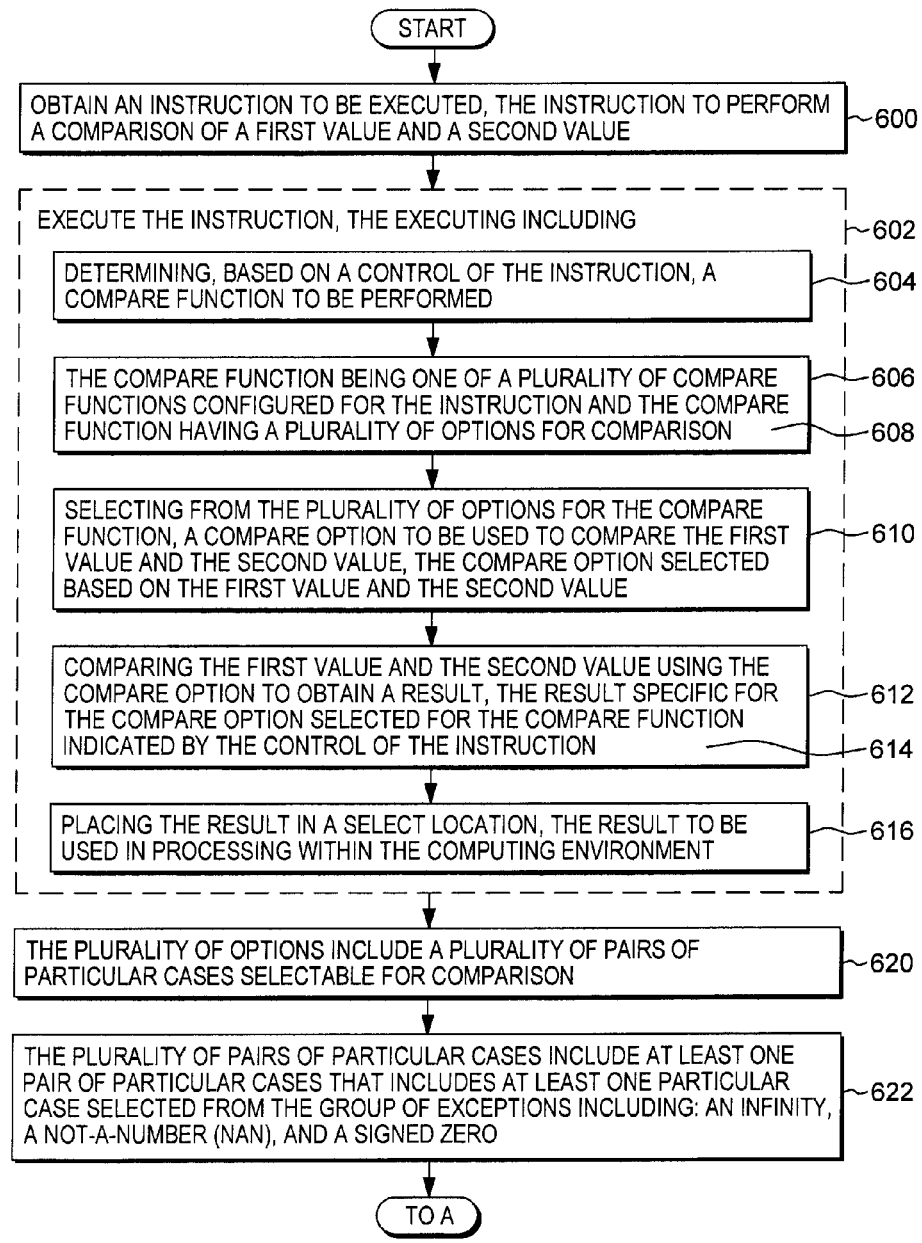
FIGS. 6A-6B depict one example of facilitating processing in a computing environment, including execution of a vector floating point maximum/minimum instruction, in accordance with an aspect of the present invention.

Referring to FIG. 6A, an instruction (e.g., a single architected machine instruction) to perform a comparison of a first value and a second value is obtained, STEP 600, and executed by at least one processor, STEP 602. The executing includes, for instance, determining, based on a control of the instruction, a compare function to be performed, STEP 604. The compare function is one of a plurality of compare functions configured for the instruction (606), and the compare function has a plurality of options for comparison (608). A compare option to be used to compare the first value and the second value is selected from the plurality of options for the compare function, STEP 610. The compare option is selected based on the first value and the second value. The first value and the second value are compared using the compare option to obtain a result, STEP 612. The result is specific for the compare option selected for the compare function indicated by the control of the instruction (614). The result is placed in a select location, and is to be used in processing within the computing environment, STEP 616.

In one example, the plurality of options include a plurality of pairs of particular cases selectable for comparison (620), and the plurality of pairs of particular cases include at least one pair of particular cases that includes at least one particular case selected from the group of particular cases including: an infinity, a not-a-number (NAN), and a signed zero (622).

Figure 6B:
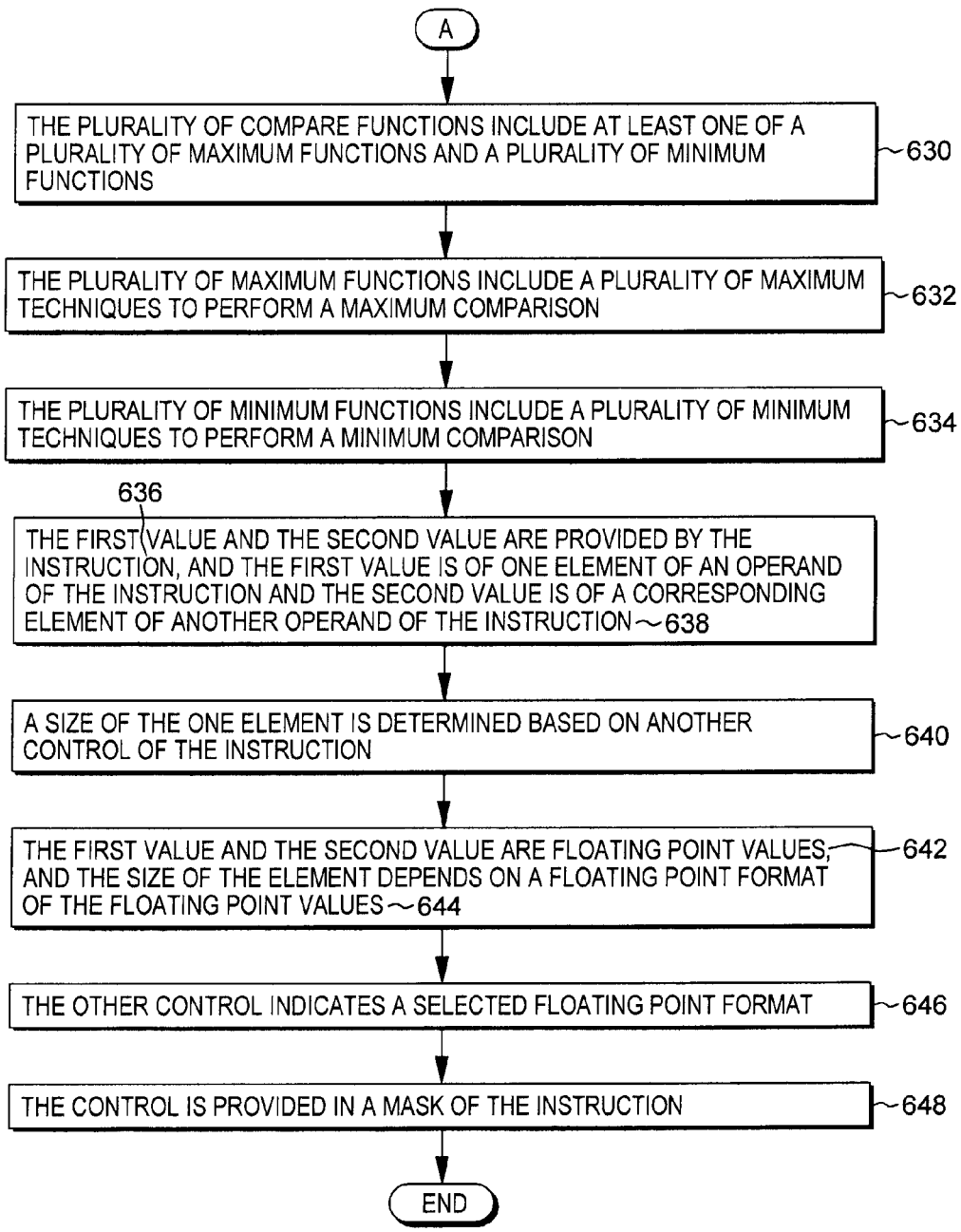

As examples, referring to FIG. 6B, the plurality of compare functions include at least one of a plurality of maximum functions and a plurality of minimum functions (630); the plurality of maximum functions include a plurality of maximum techniques to perform a maximum comparison (632); and the plurality of minimum functions include a plurality of minimum techniques to perform a minimum comparison (634).

In one embodiment, the first value and the second value are provided by the instruction (636), and the first value is of one element of an operand of the instruction and the second value is of a corresponding element of another operand of the instruction (638). As an example, a size of the one element is determined based on another control of the instruction (640).

Further, in one example, the first value and the second value are floating point values (642), the size of the one element depends on a floating point format of the floating point values (644), and the other control indicates a selected floating point format (646). Additionally, in one example, the control is provided in a mask of the instruction (648).

Described herein is a facility for using a single architected instruction to perform floating point comparisons that handles special cases. This instruction replaces a number of instructions and improves computer processing and performance.

Although various examples are provided, variations are possible without departing from a spirit of the claimed aspects. For example, values that are included in registers and/or fields used by the instruction may, in other embodiments, be in other locations, such as memory locations, etc. Many other variations are possible.

One or more aspects may relate to cloud computing.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes. One such node is node 10 depicted in FIG. 1A.

Computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

Figure 7:
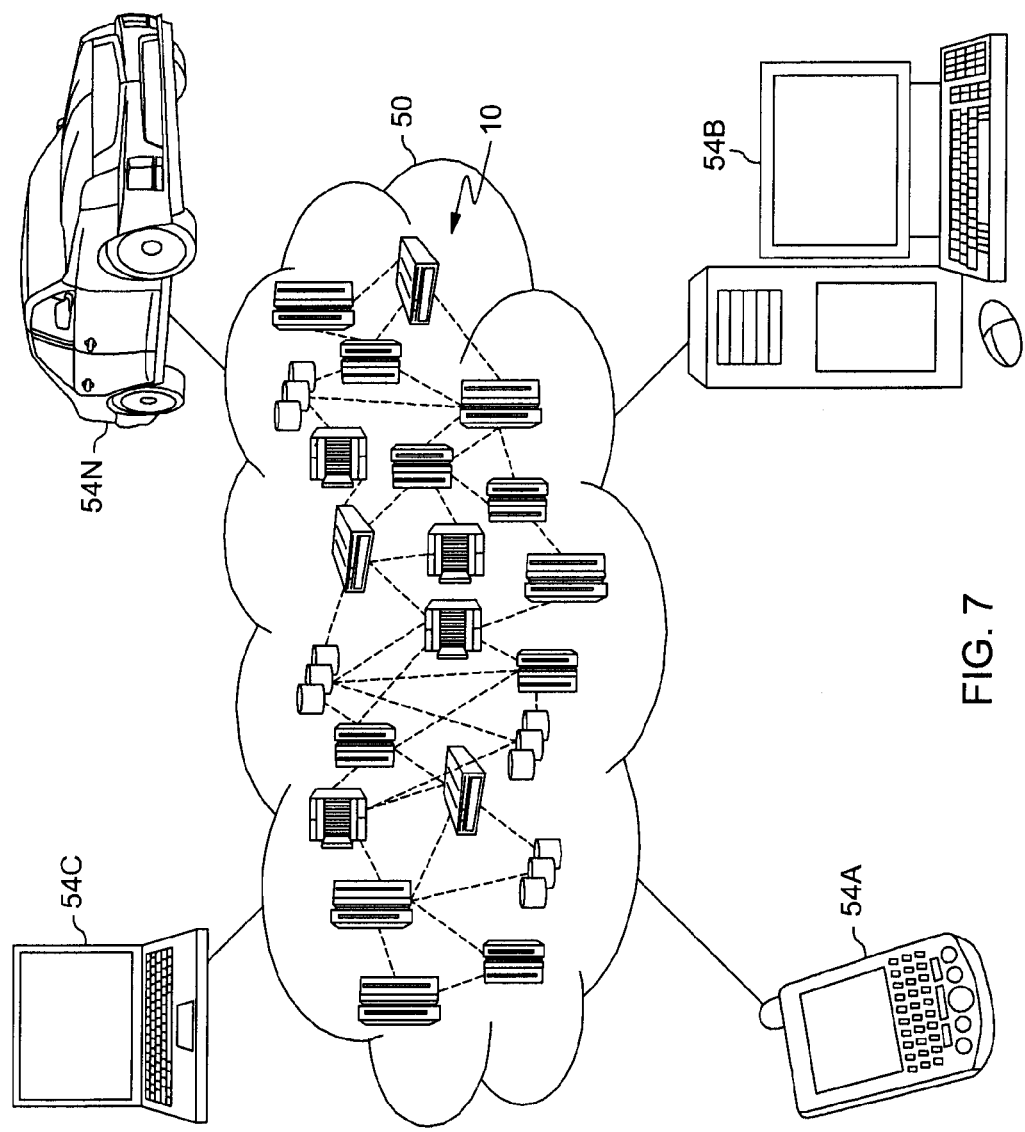
FIG. 7 depicts one embodiment of a cloud computing environment.

Referring now to FIG. 7, illustrative cloud computing environment 50 is depicted. As shown, cloud computing environment 50 comprises one or more computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
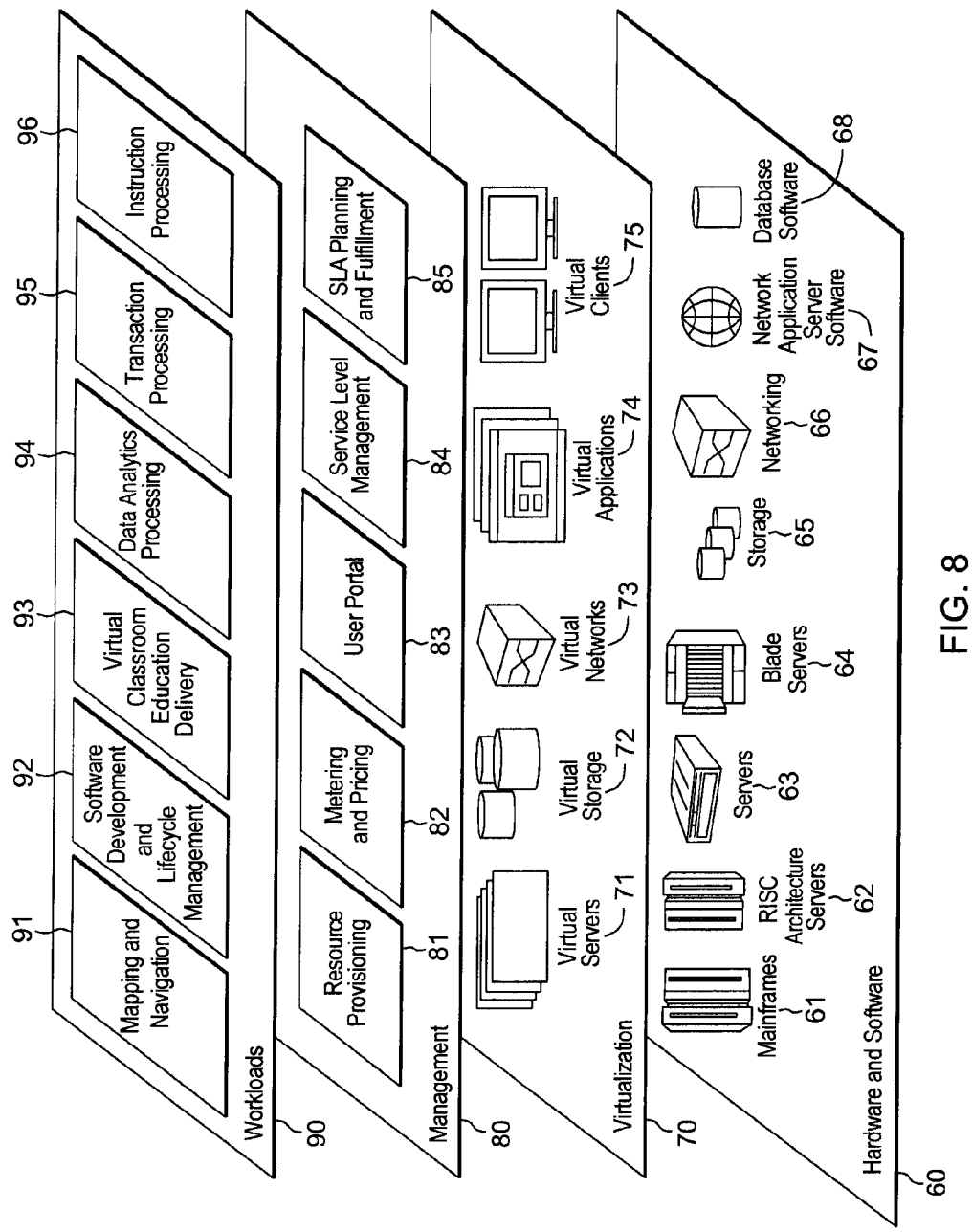
FIG. 8 depicts one example of abstraction model layers.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and instruction processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing within a computing environment, the computer program product comprising:
    a computer readable storage medium readable by a processing circuit and storing instructions for execution by the processing circuit for performing a method comprising:
        obtaining an instruction to be executed, the instruction to perform a comparison of a first value and a second value; and
        executing the instruction, the executing including:
            determining, based on a control of the instruction, a compare function to be performed, wherein the compare function is one of a plurality of different types of compare functions configured for the instruction, the plurality of different types of compare functions including a plurality of techniques for at least one type of compare operation, and wherein the compare function has a plurality of options for comparison;
            selecting, from the plurality of options for the compare function, a compare option to be used to compare the first value and the second value, the compare option selected based on the first value and the second value;
            comparing the first value and the second value using the compare option to obtain a result, the result specific for the compare option selected for the compare function indicated by the control of the instruction; and
            placing the result in a select location, the result to be used in processing within the computing environment.

2. The computer program product of claim 1, wherein the plurality of options include a plurality of pairs of particular cases selectable for comparison.

3. The computer program product of claim 2, wherein the plurality of pairs of particular cases include at least one pair of particular cases that includes at least one particular case selected from the group of particular cases comprising: an infinity, a not-a-number (NAN), and a signed zero.

4. The computer program product of claim 1, wherein the plurality of different types of compare functions include at least one of a plurality of different types of maximum functions and a plurality of different types of minimum functions.

5. The computer program product of claim 4, wherein the plurality of different types of maximum functions comprise a plurality of maximum techniques to perform a maximum comparison.

6. The computer program product of claim 4, wherein the plurality of different types of minimum functions comprise a plurality of minimum techniques to perform a minimum comparison.

7. The computer program product of claim 1, wherein the first value and the second value are provided by the instruction, and wherein the first value is of one element of an operand of the instruction and the second value is of a corresponding element of another operand of the instruction.

8. The computer program product of claim 7, wherein a size of the one element is determined based on another control of the instruction.

9. The computer program product of claim 8, wherein the first value and the second value are floating point values, and the size of the one element depends on a floating point format of the floating point values, and wherein the other control indicates a selected floating point format.

10. The computer program product of claim 1, wherein the control is provided in a mask of the instruction.

11. A computer system for facilitating processing within a computing environment, the computer system comprising:
a memory; and
a processor in communication with the memory, wherein the computer system is configured to perform operations comprising:
obtaining an instruction to be executed, the instruction to perform a comparison of a first value and a second value; and
executing the instruction, the executing including:
determining, based on a control of the instruction, a compare function to be performed, wherein the compare function is one of a plurality of different types of compare functions configured for the instruction, the plurality of different types of compare functions including a plurality of techniques for at least one type of compare operation, and wherein the compare function has a plurality of options for comparison;
selecting, from the plurality of options for the compare function, a compare option to be used to compare the first value and the second value, the compare option selected based on the first value and the second value;
comparing the first value and the second value using the compare option to obtain a result, the result specific for the compare option selected for the compare function indicated by the control of the instruction; and
placing the result in a select location, the result to be used in processing within the computing environment.

12. The computer system of claim 11, wherein the plurality of options include a plurality of pairs of particular cases selectable for comparison.

13. The computer system of claim 11, wherein the plurality of different types of compare functions include at least one of a plurality of different types of maximum functions and a plurality of different types of minimum functions.

14. The computer system of claim 11, wherein the first value and the second value are provided by the instruction, and wherein the first value is of one element of an operand of the instruction and the second value is of a corresponding element of another operand of the instruction.

15. The computer system of claim 14, wherein a size of the one element is determined based on another control of the instruction, and wherein the first value and the second value are floating point values, and the size of the one element depends on a floating point format of the floating point values, and wherein the other control indicates a selected floating point format.

16. A computer-implemented method of facilitating processing within a computing environment, the computer-implemented method comprising:
obtaining, by at least one processor, an instruction to be executed, the instruction to perform a comparison of a first value and a second value; and
executing the instruction, the executing including:
determining, based on a control of the instruction, a compare function to be performed, wherein the compare function is one of a plurality of different types of compare functions configured for the instruction, the plurality of different types of compare functions including a plurality of techniques for at least one type of compare operation, and wherein the compare function has a plurality of options for comparison;
selecting, from the plurality of options for the compare function, a compare option to be used to compare the first value and the second value, the compare option selected based on the first value and the second value;
comparing the first value and the second value using the compare option to obtain a result, the result specific for the compare option selected for the compare function indicated by the control of the instruction; and
placing the result in a select location, the result to be used in processing within the computing environment.

17. The computer-implemented method of claim 16, wherein the plurality of options include a plurality of pairs of particular cases selectable for comparison.

18. The computer-implemented method of claim 16, wherein the plurality of different types of compare functions include at least one of a plurality of different types of maximum functions and a plurality of different types of minimum functions.

19. The computer-implemented method of claim 16, wherein the first value and the second value are provided by the instruction, and wherein the first value is of one element of an operand of the instruction and the second value is of a corresponding element of another operand of the instruction.

20. The computer-implemented method of claim 19, wherein a size of the one element is determined based on another control of the instruction, and wherein the first value and the second value are floating point values, and the size of the one element depends on a floating point format of the floating point values, and wherein the other control indicates a selected floating point format.

* * * * *